US012789296B2

(12) United States Patent
Abramov et al.

(10) Patent No.: US 12,789,296 B2
(45) Date of Patent: Nov. 10, 2026

(54) METHOD AND APPARATUS FOR FORMING HOLES IN BRITTLE MATERIALS ASSISTED BY STRESS REDUCTION THROUGH HEATING

(71) Applicant: CORNING INCORPORATED, Corning, NY (US)

(72) Inventors: Anatoli Anatolyevich Abramov, Painted Post, NY (US); Alejandro Antonio Becker, Stockdorf (DE)

(73) Assignee: CORNING INCORPORATED, Corning, NY (US)

( * ) Notice: Subject to any disclaimer, the term of this patent is extended or adjusted under 35 U.S.C. 154(b) by 1249 days.

(21) Appl. No.: 17/637,513

(22) PCT Filed: Aug. 28, 2020

(86) PCT No.: PCT/US2020/048567

§ 371 (c)(1),
(2) Date: Feb. 23, 2022

(87) PCT Pub. No.: WO2021/041929

PCT Pub. Date: Mar. 4, 2021

(65) Prior Publication Data

US 2022/0288723 A1 Sep. 15, 2022

Related U.S. Application Data

(60) Provisional application No. 62/894,132, filed on Aug. 30, 2019, provisional application No. 62/894,335, filed on Aug. 30, 2019.

(51) Int. Cl.
*B23K 26/384* (2014.01)
*B23K 26/06* (2014.01)
(Continued)

(52) U.S. Cl.
CPC ........ *B23K 26/384* (2015.10); *B23K 26/0622* (2015.10); *B23K 26/0665* (2013.01);
(Continued)

(58) Field of Classification Search
CPC .............. B23K 26/0608; B23K 26/384; B23K 26/0622; B23K 26/082; B23K 26/60;
(Continued)

(56) References Cited

U.S. PATENT DOCUMENTS 4,441,008 A * 4/1984 Chan ...................... B23K 26/40
219/121.66
8,995,029 B2 3/2015 Shah et al.
(Continued)

FOREIGN PATENT DOCUMENTS

CN 106735943 A 5/2017
CN 106735943 B * 10/2018 ........... B23K 26/064
(Continued)

OTHER PUBLICATIONS

Machine translation of CN-106735943-B, Mar. 2205 (Year: 2025).*
(Continued)

*Primary Examiner* — Edward F Landrum
*Assistant Examiner* — Theodore J Evangelista
(74) *Attorney, Agent, or Firm* — Kevin M. Able

(57) ABSTRACT

A method of making a brittle substrate comprising the steps of: (i) heating at least a portion of the substrate at least to the depth d to a temperature Tp that is above 500° C., but below 1500° C., to form a heated area of the substrate; and (ii) irradiating at least a portion of the heated area of the brittle substrate with a laser beam emitted from an IR laser to form at least one hole in the brittle substrate.

34 Claims, 5 Drawing Sheets

(51) Int. Cl.

| | |
|---|---|
| ***B23K 26/0622*** | (2014.01) |
| ***B23K 26/08*** | (2014.01) |
| ***B23K 26/082*** | (2014.01) |
| ***B23K 26/14*** | (2014.01) |
| ***B23K 26/402*** | (2014.01) |
| ***B23K 26/60*** | (2014.01) |
| ***B23K 103/00*** | (2006.01) |

(52) U.S. Cl.
CPC ........ *B23K 26/082* (2015.10); *B23K 26/0853* (2013.01); *B23K 26/14* (2013.01); *B23K 26/402* (2013.01); *B23K 26/60* (2015.10); *B23K 2103/52* (2018.08); *B23K 2103/54* (2018.08)

(58) Field of Classification Search
CPC B23K 26/0665; B23K 26/0853; B23K 26/14; B23K 26/402; B23K 2103/52; B23K 2103/54
See application file for complete search history.

(56) References Cited

U.S. PATENT DOCUMENTS

| | | | | |
|---|---|---|---|---|
| 9,102,011 | B2 | 8/2015 | Hosseini | |
| 9,278,886 | B2 | 3/2016 | Boek et al. | |
| 9,517,963 | B2 | 12/2016 | Marjanovic et al. | |
| 9,656,909 | B2 | 5/2017 | Burket et al. | |
| 9,687,936 | B2 | 6/2017 | Marjanovic et al. | |
| 9,938,187 | B2 | 4/2018 | Hosseini | |
| 9,953,912 | B2 | 4/2018 | Goers | |
| 9,956,646 | B2 | 5/2018 | Mendes et al. | |
| 2005/0155956 | A1 | 7/2005 | Hamada et al. | |
| 2006/0169677 | A1 | 8/2006 | Deshi | |
| 2009/0013724 | A1 | 1/2009 | Koyo et al. | |
| 2014/0116091 | A1 | 5/2014 | Chuang et al. | |
| 2015/0034612 | A1 | 2/2015 | Hosseini et al. | |
| 2015/0044416 | A1 | 2/2015 | Hosseini | |
| 2017/0066680 | A1* | 3/2017 | Gu | B23K 26/14 |
| 2017/0096361 | A1* | 4/2017 | Horiuchi | B23K 26/402 |
| 2017/0282299 | A1 | 10/2017 | Ono | |
| 2020/0087193 | A1 | 3/2020 | Abramov et al. | |
| 2020/0130105 | A1* | 4/2020 | Isobe | B23K 26/362 |

FOREIGN PATENT DOCUMENTS

| | | | |
|---|---|---|---|
| EP | 2837462 | A2 | 2/2015 |
| JP | 2013-119510 | A | 6/2013 |
| KR | 10-2005-0059103 | A | 6/2005 |
| KR | 10-2015-0016168 | A | 2/2015 |
| WO | 2004/020140 | A1 | 3/2004 |
| WO | 2016/073807 | A1 | 5/2016 |
| WO | WO-2020149040 | A1 * | 7/2020 |

OTHER PUBLICATIONS

Machine translation of WO-2020149040-A1, Mar. 2025 (Year: 2025).*

Chinese Patent Application No. 202080077096.5, Office Action dated Jun. 28, 2024, 5 pages (English Translation only), Chinese Patent Office.

International Search Report and Written Opinion of the International Searching Authority; PCT/US2020/048567; mailed on Dec. 14, 2020; 15 pages; European Patent Office.

Chinese Patent Application No. 202080077096.5, Office Action dated Dec. 7, 2023, 5 pages (English Translation only), Chinese Patent Office.

Korean Patent Application No. 10-2022-7009769, Office Action dated Mar. 7, 2025, 3 pages (English Translation only), Korean Patent Office.

* cited by examiner

METHOD AND APPARATUS FOR FORMING HOLES IN BRITTLE MATERIALS ASSISTED BY STRESS REDUCTION THROUGH HEATING

CROSS-REFERENCE TO RELATED APPLICATIONS

This application claims the benefit of priority under 35 U.S.C. § 371 of International Application No. PCT/US2020/048567, filed on Aug. 28, 2020, which claims the benefit of priority under 35 U.S.C § 119 of U.S. Provisional Application Ser. No. 62/894,335 filed on Aug. 30, 2019, which claims the benefit of priority under 35 U.S.C § 119 of U.S. Provisional Application Ser. No. 62/894,132 filed on Aug. 30, 2019, the content of which is relied upon and incorporated herein by reference in its entirety.

BACKGROUND

The disclosure relates generally to a method of laser forming of holes in glass, glass substrates, and a hole forming apparatus.

Known laser ablation-based hole forming methods in brittle materials or in substrates made of brittle materials (e.g., glass, glass-ceramic or ceramic substrates which under stress break or crack without significant plastic deformation) have a problem of crack formation during hole formation or shortly after hole formation in the areas around the holes and at or near the holes' inner walls. If not treated and removed by etching, the cracks reduce the substrate's strength and eventually may cause substrate breakage. The etching is time consuming and adds cost to the final substrate comprising such holes.

No admission is made that any reference cited herein constitutes prior art. Applicant expressly reserves the right to challenge the accuracy and pertinency of any cited documents.

SUMMARY

One embodiment of the disclosure relates to a method of making a brittle substrate having at least one hole with a depth d (μm), the method comprising the steps of:

(i) heating at least a portion of the substrate at least to the depth d to a temperature Tp that is above 500° C. and below 1500° C., to form a heated area of the substrate; and (ii) irradiating at least a portion of the heated area of the substrate with a laser beam emitted from an IR laser to form at least one hole in the substrate.

According to some embodiments, the brittle substrate is a glass, glass-ceramic or a ceramic substrate.

According to some embodiments, the method further comprises the step of supporting the heated substrate while the heated substrate and the laser beam move relative to one another.

According to some embodiments the temperature Tp is above 500° C. and below 1000° C., for example between 500° C. and 900° C. or between 600° C. and 900° C. According to one embodiment the temperature Tp is below the softening point temperature of the substrate material by at least 10° C. According to one embodiment the temperature Tp is below the softening point temperature of the substrate material by 10° C. to 50° C.

According to one embodiment, the laser beam has a power density $P_d$ (W/cm$^2$), defined by $P_d = P_0/S$ where $P_0$ and S are the power and the beam cross-sectional area of the laser beam on the substrate surface, respectively, of not less than 5 kW/cm$^2$.

One embodiment of the disclosure relates to a method of making a brittle substrate having at least one hole with a depth d (μm), the method comprising the steps of:

(i) heating at least a portion of the substrate at least to the depth d to a temperature Tp, such that the temperature Tp is above the annealing point temperature and below the softening point temperature, to form a heated area of the substrate;

(ii) irradiating at least a portion of the heated area of the substrate with a laser beam emitted from an IR laser to form at least one hole in the substrate.

According to one embodiment 500° C.≤Tp≤900° C. According to one embodiment Tp, the temperature Tp is below the softening point temperature of the substrate material by at least 10° C.

According to one embodiment a method of making a brittle substrate having at least one hole comprises the steps of:

(i) heating at least a portion of the brittle substrate at least to the depth d to a temperature Tp, such that the temperature Tp is above the annealing point temperature and below the softening point temperature of the substrate material, thereby forming a heated area of the substrate;

(ii) irradiating at least a portion of the heated area of the substrate with a laser beam emitted from an IR laser to form at least one hole in the brittle substrate. According to some embodiments the brittle substrate is a glass-ceramic substrate or a ceramic substrate.

According to one embodiment, the heating step comprises heating at least a a portion of the substrate to temperature Tp, where the temperature Tp is above the annealing point temperature of the substrate by at least 10° C. and below the softening point temperature by at least 10° C. According to one embodiment, the heating step comprises heating at least a portion of the substrate to temperature Tp, where the temperature Tp is above the annealing point temperature of the substrate by 10° C. to 20° C., and/or below the softening point temperature by 10° C. to 20° C. According to one embodiment, the heating step comprises heating the entire substrate to an average temperature Tp, where the temperature Tp is above annealing point temperature of the substrate by at least 10° C. and below softening point temperature by at least 10° C.

According to some embodiments the heating step comprises heating portions of the substrate the average temperature Tp by a pulsed laser providing a defocused pulsed laser beam or by a CW laser providing a CW (continuous wavelength) laser beam. According to some embodiments According to some embodiments, 30 μm≤d≤5000 μm. According to some embodiments, 50 μm≤d≤1000 μm. According to some embodiments, 50 μm≤d≤750 μm. According to some embodiments, 100 μm≤d≤750 μm, or according to some embodiments, 200 μm≤d≤750 μm, or 300 μm≤d≤750 μm.

According to some embodiments, the laser beam is condensed by a at least one focusing component (e.g., lens) into a spot size on the substrate surface with diameter D of ≤0.5 mm, and the laser beam is emitted from a $CO_2$ or a CO laser for an irradiation time t, where the irradiation time t is from about 0.1 ms to about 500 ms. According to some embodiments, D≤0.25 mm, or D≤0.1 mm, or D≤0.05 mm. According to some embodiments, D≤0.25 mm, and the irradiation time t is from about 0.1 ms to about 250 ms. According to some embodiments, the irradiation time is in the range 0.1 ms≤t≤25 ms, for example 0.1 ms≤t≤5 ms, or 0.1 ms≤t≤2.5 ms.

According to at least some embodiments, a second (i, e., additional) laser beam is utilized in order to provide localized heating of a designated portion of the substrate.

According to some embodiments, if a discrete area heating laser is utilized to provide localized heating of a designated portion of the substrate, the discrete area heating laser preheats an area (or region) of the substrate that is, for example, between 100 μm and about 12000 μm in width, and according to some embodiments between 500 μm and about 12000 μm or between 1000 μm and 12000 μm. According to some embodiments, the discrete area heating laser is used in conjunction with optical components (e.g., defocusing lens (s)) to provide a defocused laser beam on the substrate, in order to heat the substrate prior to and during hole formation.

One embodiment of the disclosure relates to a method of making a brittle substrate having at least one hole with a depth of at least d (μm), the method comprising:

(i) heating at least a portion of the substrate at least to the depth d to a temperature Tp that is above the annealing point and below the softening point, to form at least one heated area of the substrate (the heated area may encompass the entire substrate or only a portion of the substrate);

(ii) irradiating at least a portion of the heated area of the substrate with a laser beam emitted from an IR laser to form at least one hole in the substrate, wherein the laser beam is delivered to the substrate after being condensed by an optical system; and wherein said heating step provides stress relaxation and/or reduction of transient and residual stress, around the hole during formation of the hole in the substrate.

Preferably the heating step provides stress relaxation and/or reduction of transient and residual stress around the hole location prior to formation of the hole in the substrate, as well as during formation of the hole in the substrate, and during the subsequent cooling of the substrate.

According to at least some embodiments, a second laser beam is utilized in order to provide localized heating of a portion of the substrate.

Another embodiment relates to an apparatus for forming a hole with a depth of d (μm) in a brittle substrate having at least one substrate surface, the apparatus comprising:

a heater structured to pre-heat the substrate prior to hole formation;

a laser capable of providing a laser beam;

at least one optical component configured to condense the laser beam into the substrate, the lens forming a condensed laser beam such that pre-heated substrate is irradiated with the condensed laser beam for an irradiation time t sufficient to form a hole in the substrate.

According to some embodiments the apparatus is structured such that said at least one substrate surface is protected from debris generated during hole forming by a heated gas flow that prevents deposition of the debris on said at least one substrate surface.

According to some embodiments the apparatus further comprises a component structured to provide heated gas flow at or adjacent to at least one of the substrate surfaces, preventing or minimizing deposition of debris on the substrate surface.

For example, one embodiment relates to an apparatus for forming a hole with a depth of d (μm) in a brittle substrate, the apparatus comprising:

(i) a heater for preheating the substrate prior to hole formation, the heater comprising: an infrared incoherent heater, or an infrared discrete (area) heating laser;

(ii) a laser configured to emit a pulsed laser beam;

(iii) at least one optical component configured to condense the pulsed laser beam into the substrate, wherein the substrate is irradiated with the pulsed laser beam at the same location (i.e., to above 500° C. and below 1500° C. (for example above 600° C. and below 1000° C.) for an irradiation time t (msec), by a single pulse or by multiple pulses, the pulsed laser beam forming a hole in the substrate; and the apparatus is structured such that at least one substrate surface is protected from debris generated during hole forming by using heated gas flow to prevent deposition of particles on the at least one substrate surface.

According to some embodiments, the apparatus further comprises a laser beam scanner configured to scan the laser beam across the surface of the substrate.

According to some embodiments, the apparatus comprises a stage configured to support the preheated substrate during hole formation. According to some embodiments the stage is capable of supporting the heated substrate while the heated substrate and the laser beam move relative to one another. According to some embodiments, the stage is configured to be movable in the X-Y direction.

For example, one embodiment relates to an apparatus for forming a hole with a depth of d (μm) in a brittle substrate, the apparatus comprising:

a heater structured to pre-heat the substrate prior to hole formation;

a laser capable of providing a laser beam;

at least one optical component configured to condense the laser beam into the substrate, said at least one optical component forming a condensed laser beam such that the pre-heated substrate is irradiated with the condensed laser beam for an irradiation time t (msec) by a single or multiple laser pulses, the condensed laser beam being capable of forming a hole in the brittle substrate, the apparatus being further configured such that the substrate surfaces are protected from debris generated during hole forming via a heated gas flow that prevents deposition of the debris on the substrate surface.

Yet another embodiment relates to an apparatus for forming a hole with a depth of d (μm) or more in a brittle substrate, the substrate having multiple surfaces, the apparatus comprising:

a heater for preheating the substrate prior to hole formation; and at least one lens configured to condense the laser beam onto the pre-heated substrate, wherein the brittle substrate is irradiated with the laser beam for an irradiation time t (msec) by a single or multiple pulses, the laser beam forming a hole in the brittle substrate, and wherein the substrate surfaces are protected from debris generated during hole forming via heated gas flow to prevent deposition of debris on substrate surface.

According to some embodiments the heater for preheating the substrate is a furnace. According to some embodiments the heater for preheating the substrate is an IR (infrared) laser.

According to some embodiments, the heater comprises an infrared incoherent heater, or an infrared discrete area heating laser, or a laser configured to emit a pulsed laser beam. If a discrete area heating laser is utilized, the discrete area heating laser may, for example, preheat an area of the substrate that is between 100 μm and about 12000 μm in width, between 500 μm and about 1200 μm in width, or between 1000 μm and about 12000 μm in width, or between 1000 μm and about 10000 μm in width (or diameter).

According to some embodiments, the hole has a depth d, and 10 μm≤d. According to some embodiments, the hole has a depth d, and 10 μm≤d≤5000 According to some embodiments, 30 μm≤d≤5000 μm.

According to some embodiments, the hole diameter is ≤1000 μm and in some embodiments ≤500 or ≤250 or ≤100 or ≤50 According to some embodiments, the hole diameter is about 30 μm to 500 μm, for example 30 μm to 100 μm. According to some embodiments, the hole diameter is an entrance hole diameter. According to some embodiments, the entrance hole diameter is the diameter of the hole at the location where the incident laser beam is condensed (by the focusing component(s)) on the surface of the substrate (and forms a spot on substrate surface with diameter D on substrate surface).

The embodiments of the method and the apparatus disclosed herein advantageously solve the problem of crack formation during the drilling process associated with common ablation-based laser hole forming methods. In addition, the embodiments of the method and the apparatus disclosed herein advantageously improve the quality of the formed holes and of the regions adjacent to and surrounding the holes, allowing one to maintain substrate strength. Furthermore, the embodiments of the method and the apparatus advantageously result in reduction of post-drilling treatment process time, for example reduction of etching duration (if it is required), or even the complete elimination of the need to etch. The embodiments of the method and the apparatus can utilize an inexpensive $CO_2$ laser, while enabling a fast and high throughput laser hole forming process.

The embodiments described herein advantageously reduce cost and manufacturing time when making panel components that include multiple holes.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
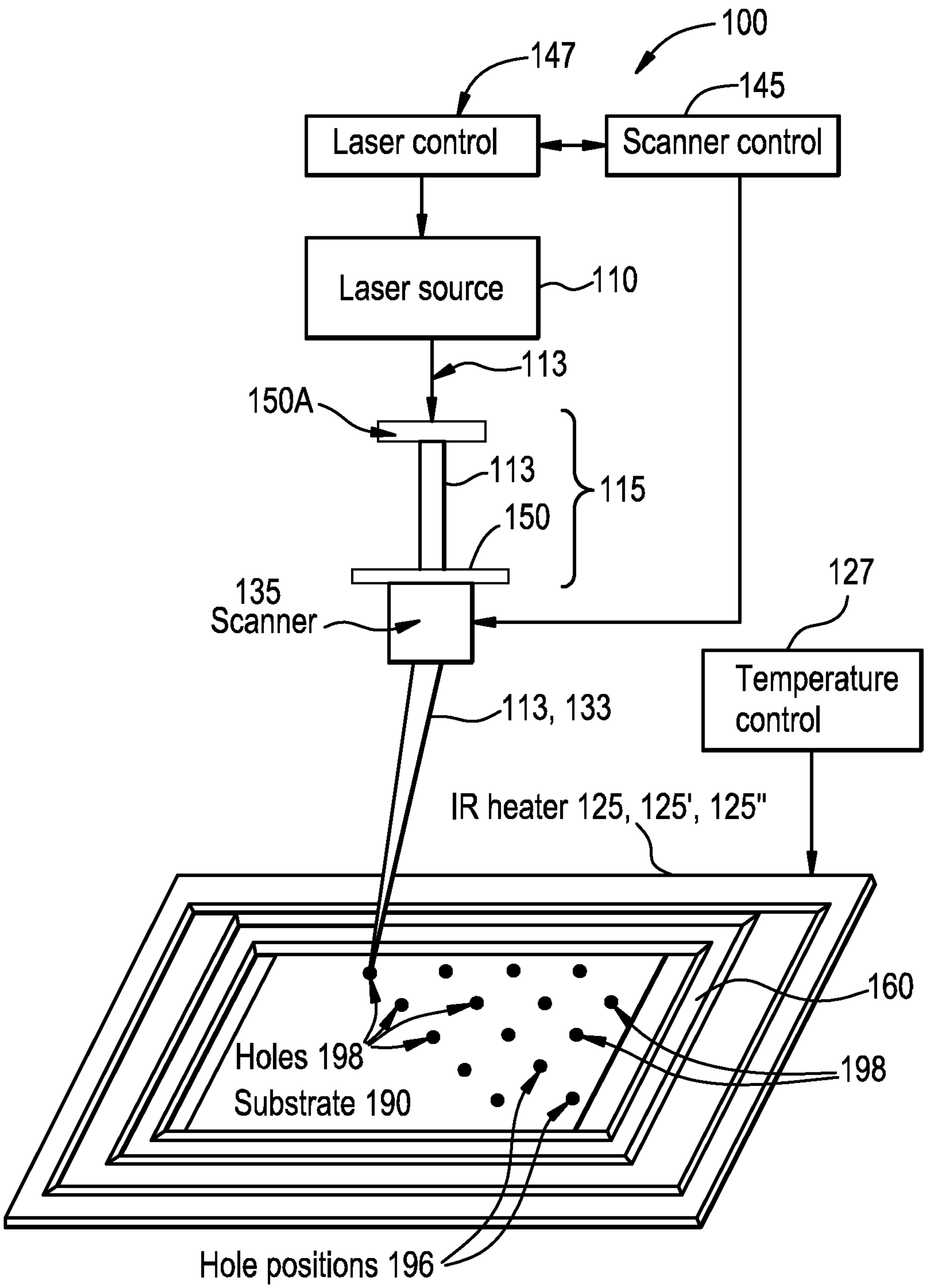
FIG. 1 is a schematic cross-sectional view of apparatus for laser hole forming in brittle substrates according to one embodiment.

The strength of thin (i.e., <5 mm thin) brittle substrates (e.g., glass-ceramic substrates, ceramic substrates, or glass substrates such as, for example oxide-based glasses) may be much lower than the theoretical strength due to defects and flaws on the substrate surface. Such defects and flaws may concentrate stresses by 10-100 times relative to that of a substrate material that does not contain holes. This lowers the material’s fracture threshold, and leads to substrate breakage. Once concentrated, stress achieves levels that can break atomic bonds, and fracture is initiated in the substrate. During laser assisted hole forming in brittle materials, stresses can be concentrated in the substrate material (including the surface, and the areas directly adjacent to the hole), leading to the undesirable cracking of the brittle material. A brittle material is a material that breaks or cracks under stress without significant plastic deformation. A brittle material may be, for example, glass glass-ceramic, or ceramic. Accordingly, it is important to minimize stresses in the substrate material during the hole formation.

Applicants discovered that, surprisingly, heating of the substrate to a temperature Tp, such that the temperature Tp is below 1500° C. but above 500° C. causes significant and quick transient stress relaxation during hole formation (e.g., via laser drilling and/or ablation) and this stress relaxation inhibits crack formation around the holes in brittle substrates, especially while forming these holes. Some embodiments of the method and the apparatus described herein utilize a pulsed laser beam that forms the holes in a substrate made from a brittle material, while the substrate is heated above 600° C. but below 1000° C. (e.g., from 600° C. to less than 850° C.).

Heating (preheating) the substrate before hole formation, heating the substrate during hole formation, and preferably heating the substrate or keeping the substrate’s temperature elevated above 500° C. but less than 1500° C. (or example to a temperature Tp that is above 600° C. and below 1000° C.) for at least 1 to 30 minutes after the hole formation, inhibits crack formation around the holes in brittle substrates. The chosen temperature Tp is selected within the indicated range (i.e., above 500° C. and below 1500° C.) based on the specific composition of the brittle substrate.

For example, the temperature of the pre-heated substrate may be ≥600° C., ≥650° C., ≥700° C., ≥750° C., ≥800° C., ≥820° C., or ≥840° C. According to some embodiments, the temperature of the pre-heated substrate may be, for example, between 500° C. and 1500° C. between 500° C. and 1200° C. or between 500° C. and 1000° C., or between 600° C. and 900° C., or between 600° C. and 845° C., or between 625° C. and less than 850° C., or between 625° C. and 830° C.

It is also preferable that the temperature of the substrate be 10° C. to 50° C. below the softening point temperature of the substrate material, because within this temperature range the stress relaxation happens faster than at lower temperatures.

Applicants discovered that, surprisingly, heating of the substrate below the softening point temperature (e.g., 10° C. to 50° C. or 10° C. to 30° C., or 10° C. to 15° C. below the softening point temperature) of the substrate, causes significant and fastest transient stress relaxation during hole formation (e.g., via laser drilling and/or ablation) and this stress relaxation inhibits crack formation around the holes in brittle substrates, especially while forming these holes. Some embodiments of the method described herein utilize a pulsed laser beam that forms the holes in a substrate made from a brittle material, while the substrate is heated to a temperature range above the glass annealing point (preferably by at least 10° C., for example, by at least 15° C., by at least 20° C., by at least 25° C., by at least 30° C., by at least 35° C., by at least 40° C., or by at least 50° C. above the glass annealing point temperature), but below (preferably at least 10-15° C. below) the substrate material's (e.g., glass) softening point temperature. When the brittle substrates were at a temperature at least 10° C. above the annealing point temperature but at least 10° C. below the softening point temperature during laser assisted hole formation, there was no significant crack formation observed due to hole formation, or shortly after.

As defined herein the softening point temperature of the substrate material (also referred to as the softening temperature herein) is the temperature corresponding to material viscosity of $10^{7.6}$ Poise. As defined herein the annealing point temperature (also referred to as the annealing temperature herein) of the material is the temperature corresponding to material's viscosity of $10^{13.4}$ Poise. It is noted that different substrates may have different annealing point temperatures and/or different softening point temperatures, which depend on specific composition of substrate material.

Thus, applicants discovered that, surprisingly, heating of a brittle substrate to or above the annealing temperature and below the softening point temperature causes significant and quick transient stress relaxation during hole formation (e.g., via laser drilling and/or ablation) and this stress relaxation inhibits crack formation around the holes in brittle substrates, especially while forming these holes. Heating (preheating) of the substrate before hole formation, heating the substrate during hole formation, and preferably heating the substrate or keeping the substrate's temperature for at least 1 to 30 minutes after the hole formation, such that the temperature of the substrate is between the softening point temperature and above annealing temperatures inhibits crack formation around the holes in brittle (e.g., glass) substrates. It is noted that different substrate materials may have different annealing point temperatures and/or different softening point temperatures, which depend on specific composition of substrate material.

Similarly, heating of a substrate below the softening point temperature (e.g., 50° C. to 10° C. below the softening point temperature of the substrate material, and preferably 30° C. to 10° C. below the softening point temperature) causes significant and quick transient stress relaxation during hole formation (e.g., via laser drilling and/or ablation) and this stress relaxation inhibits crack formation around the holes in brittle substrates.

Heating (preheating) of the substrate before hole formation, heating the substrate during hole formation, and preferably heating the substrate or keeping the substrate temperature for at least 1 to 25 minutes after the hole formation, such that the temperature of the substrate is between the softening point temperature and above the annealing temperature relaxation inhibits crack formation around the holes in brittle (e.g., glass) substrates.

More specifically, preheating reduces intrinsic stresses in the substrate material prior to hole formation. Then, during the hole formation, the transient stress is induced into the substrate material, but the transient stress is significantly reduced by pre-heating and/or heating of the substrate during hole formation. Without pre-heating and/or heating of the substrate during hole formation, the transient stress (es) will cause cracking (e.g., arc cracking) around the holes.

After the hole formation there is still residual stress in the substrate material (e.g., glass) in the areas surrounding the holes, therefore maintaining the substrate, or the areas around the holes either: (i) either not less than 100° C. (preferably not less than 50° C. preferably 10° C. to 30° C., and most preferably 10° C. to 15° C.) below the softening point temperature (and/or below the softening point temperature and above the annealing point temperature) helps prevent further crack formation.

Various embodiments will be further clarified by the following examples.

Example 1

FIG. 1 shows schematically an embodiment of a hole forming apparatus 100 that forms holes with a depth of d (μm) or more, with a laser in a pre-heated substrate 190 made of a brittle material. The substrate 190 may be, for example, a glass substrate, or a glass ceramic substrate, or a ceramic substrate. The substrate 190 may have, for example, a thickness between about 0.01 mm (10 μm) and about 5 mm (5000 μm), or between. 0.03 mm (30 μm) and about 5 mm (5000 μm). For example, the substrate thickness may be from about 0.5 mm (500 μm) to about 2 or 3 mm (2000 μm or 3000 μm).

More specifically, this embodiment utilizes a heat source 125, for example a heater(s) 125' or a furnace 125" to pre-heat one or more glass or glass-ceramic substrates 190 to the required processing temperature Tp, before the laser beam 113 is utilized to form the holes in the substrate(s) 190. In this embodiment the heat source 125 heats the entire substrate 190, at least to the depth d, to the temperature Tp. The depth d may be, for example 10 μm or larger. According to some embodiments, 10 μm≤d≤5000 μm. According to some embodiments, 30 μm≤d≤5000 μm.

The temperature Tp is preferably below the softening point temperature of the substrate material (by e.g., 10° C.-15° C.), and preferably above the annealing point temperature (e.g., by at least 10° C.-15° C.). For example, the temperature Tp may be above the glass annealing point of the substrate 190 (by at least 10-15° C.), but below its glass softening point temperature (by at least 10-15° C.). For example, the temperature Tp may be ≥600° C., ≥650° C., ≥700° C., ≥750° C., ≥800° C., ≥820° C., or ≥840° C., for different glass compositions. The temperature Tp may be, for example, 1500° C.≥Tp≥500° C., or 1200° C.≥Tp≥500° C., or 1000° C.≥Tp≥500° C., or 900° C.≥Tp≥600° C., or 845° C.≥Tp≥600° C.

Heating the entire substrate using an IR (infra-red) heater 125, for example a furnace or another heater, enables sufficiently uniform heating (e.g., temperature uniformity of at least within 20° C., and preferably within 10° C., for the entire heated area) of the entire substrate 190. A temperature control unit 127 may be utilized, for example, to measure the temperature of the substrate 190 and to adjust the temperature of the heat source 125 (e.g., IR heater 125) by the appropriate amount for the substrate to reach the desired temperature Tp. If a furnace is utilized as an IR heater 125, temperature control unit 127 may monitor the internal temperature of the furnace, and adjust the temperature, as appropriate.

However, in some embodiments, at least one portion 190A of the substrate 190 is heated (pre-heated) prior to hole formation.

After the entire substrate (at least one portion of the substrate) is preheated to the temperature Tp, the holes in the heated portion or area of substrate are formed by one or more laser beams 113. More specifically, the hole forming apparatus 100 shown in FIG. 1 includes at least one laser 110, an optical system 115 that includes a focusing optical component, and a stage 160. The laser 110 may be, for example, a $CO_2$ laser. In this embodiment, laser 110 is a pulsed laser, and preferably a burst pulse laser. The laser 110 provides a laser beam 113 to the optical system 115. In the embodiments described herein, the laser 110 is an IR (infra-red) laser, and has a lasing wavelength between about 5 μm and about 11 μm. The wavelength of the laser beam 113 may be, for example, in the range from 5 μm to 10.6 μm, from 5 μm to 9.6 μm, or from 9.2 to 9.8 μm. In some embodiments the wavelength of the laser beam 113 may be, for example, 5 μm, 9.2 μm, 9.6 μm, 10.6 μm, or therebetween. In the embodiment of FIG. 1, laser beam 113 is scanned via a laser beam scanner 135 across the surface of the substrate, such that laser beam 113 is moved to the desired locations, in order to form multiple holes 198 in the substrate 190. Scanner controller 145 is operatively coupled to the laser (for example, via a laser controller 147) and the scanner 135, and operatively connects the laser 110 and the laser beam scanner 135 such that the laser pulses are delivered by the laser beam 113 at the desired (predetermined) hole positions 196.

The focusing optical component (e.g., lens 150) of the optical system 115 has the role of condensing the laser beam 113 at predetermined positions (i.e., at the irradiation positions 196) onto the substrate 190. The stage 160 has the role of supporting the substrate 190. The stage 160 may be a stage that can be moved in the X-Y direction. As stated above, the substrate 190 may be, for example, a glass substrate.

When a hole is to be formed in the substrate 190 using the first hole forming apparatus 100 having the above-described configuration, first the substrate 190 is placed on the stage 160. For example, the substrate 190 has a first surface 192 and a second surface 194 opposite to each other. The substrate 190 is placed on the stage 160, so that the second surface 194 is on the stage 160 side.

The stage 160 may have one or more components for fixing the glass, glass-ceramic, or ceramic substrate 190 in its required position on the stage 160. For example, the stage 160 may have a suction mechanism, by which the substrate 190 is suctioned and fixed on the stage 160. By using the stage 160 having the above-described configuration, position deviation of the substrate 190 during processing is inhibited. It is preferred that the stage 160 has an air-bearing capability combined with a vacuum suction or mechanical clamping/support mechanism for the substrate, that enables an air-gap between the stage and substrate surface during the hole making process.

Next, the laser beam 113 is delivered from the laser 110 to the optical system 115. As described above, the optical system 115 includes at least one focusing lens 150. The optical system 115 shapes the laser beam provided by the laser, and the laser beam exits the focusing lens 150 as a condensed laser beam 113 having a desired shape. The condensed laser beam 113 exiting the focusing lens is delivered to the irradiation position 196 of the substrate 190 for a specified period of time (i.e., for the irradiation time t).

After the substrate 190 is preheated (i.e., after the step of heating the substrate 190 above the annealing temperature of the substrate material, but to a temperature lower than its softening temperature) the condensed laser beam 133 irradiates the substrate at the irradiation position 196. The condensed laser beam 133 then ablates the substrate material at and below the irradiation position 196, thus removing the substrate material existing in these regions. According to the above-described operation, the hole 198 is formed at the irradiation position 196 of the preheated substrate 190.

As illustrated in FIG. 1, the hole 198 formed in the substrate 190 may be a through-hole. Alternatively, the hole 198 may be a non-through hole. As mentioned above, the substrate 190 may be a glass substrate, a glass ceramic substrate, or a ceramic substrate.

By scanning the focused laser beam via the laser beam scanner 135 across the surface of the substrate 190 in the X-Y plane and performing the same operations, a plurality of holes 198 can be formed in the substrate 190. Alternatively, instead of using a scanner, a plurality of holes 198 can be formed in the substrate 190 by moving the stage 160 in the X-Y plane, and performing the same operations. Stage 160 that is constructed to be in the X-Y plane is also utilized, for example, in embodiment 2 described below.

According to some embodiments, a method of making a brittle substrate (e.g., a glass, or glass-ceramic substrate) having at least one hole comprises the following two steps:

(I) Heating (e.g., preheating) at least a portion of the substrate 190 at least to the depth d to a temperature Tp. In some embodiments, the substrate is a glass-ceramic substrate and the temperature Tp is above 500° C. and below 1500° C. to form a heated area of the substrate 190. According to some embodiments, the substrate is a glass or a glass-ceramic substrate, and the temperature Tp is between 500° C. and 1200° C. According to some embodiments, the substrate is a glass substrate or a glass-ceramic substrate and the temperature Tp is between 600° C. and 1200° C., or between 500° C. and 1000° C., or between 500° C. and 1000° C., or between 600° C. and 1000° C., or between 600° C. and 900° C. The heated area may be over a small portion of the substrate, or may extend throughout the entire substrate.

(II) Irradiating at least a portion of the heated area of the substrate 190 with a condensed laser beam emitted from IR laser 110 to form at least one hole 198 in the preheated substrate 190, wherein the laser beam irradiating the heated area is delivered to the substrate after being condensed by an optical system.

According to some embodiments, a method of making a brittle substrate (e.g., a glass substrate) having at least one hole comprises the two following steps:

(I) Heating (e.g., preheating) at least a portion of the substrate 190 at least to the depth d to a temperature Tp below the glass softening point to form a heated area of the substrate 190. The heated area may be over a small portion of the substrate, or may extend throughout the entire substrate. In the embodiment of FIG. 1, the entire substrate is heated by an IR source; and (II) Irradiating at least a portion of the heated area of the substrate 190 with a condensed laser beam emitted from IR laser 110 to form at least one hole 198 in the preheated substrate 190, wherein the laser beam is delivered to the substrate after being condensed by an optical system.

According to some embodiments the temperature Tp is between 100° C. and 10° C. below the softening point temperature of the substrate. According to some embodiments the temperature Tp is between 50° C. and 10° C. below the softening point temperature of the substrate. According to some embodiments the temperature Tp is between 30° C. and 10° C. below the softening point temperature of the substrate. According to some embodiments the temperature Tp is between 15° C. and 10° C. below the softening point temperature of the substrate. According to some embodiments, the substrate is a glass substrate and the temperature Tp is between 10° C. below the softening point temperature of the substrate and 10° C. above the annealing temperature of the substrate.

According to embodiments described herein a method of making a brittle substrate (e.g., a glass substrate) having at least one hole comprises the following steps:

(I) Heating (e.g., preheating) at least a portion of the substrate 190 at least to the depth d to a temperature Tp above the glass annealing point temperature, but below the glass softening point temperature to form a heated area of the substrate 190. The heated area may be over a small portion of the substrate, or may extend throughout the entire substrate. (In the embodiment of FIG. 1, the entire substrate is heated by an IR source.)

(II) Irradiating at least a portion of the heated area of the substrate 190 with a condensed laser beam emitted from IR laser 110 to form at least one hole 198 in the preheated substrate 190, wherein the laser beam is delivered to the substrate after being condensed by an optical system.

The heating step provides stress relaxation—i.e., the reduction of transient and/or residual stress in the substrate material, at and/or around the hole location (i.e., irradiation position 196) prior to formation of the hole, and during formation of the hole 198 in the substrate. It is preferable that the substrate is held (e.g., for 1-30 min, 1-25 min, and preferably 5-20 min) at above the annealing point temperature of the substrate material to further minimize the residual stresses present in the substrate immediately after the formation of hole 198, so as to reduce or eliminate crack formation within the substrate material (e.g., within glass). The resultant hole 198 has a depth d that is either equal to substrate's thickness (for a through hole) or smaller than the substrate thickness (for a "blind" hole). The hole depth d may be, for example, 30 μm to 5000 μm (5 mm), for example 30 μm to 3000 μm (3 mm).

The condensed laser beam 133 irradiates a spot on the substrate surface, such that the laser beam spot on the substrate surface preferably has a spot diameter D of ≤0.5 mm. For example, in some embodiments, the heated substrate is irradiated with a laser beam emitted from a $CO_2$ or a CO laser for an irradiation time t (ms), to form a hole 198 in the substrate, where the irradiation time t is in the range of about 0.1 ms to about 500 ms.

For example, the laser beam 113 is condensed by a focusing optical component of the optical system into a spot (having a desired spot size) on the substrate surface facing the optical system, such that the beam diameter (spot diameter) D on the surface of the substrate is satisfies D of ≤0.5 mm; wherein the laser beam 113 is emitted from a $CO_2$ or a CO laser 110 for the irradiation time t, where the irradiation time t is from about 0.1 ms to about 500 ms.

According to some embodiments, the spot diameter D is: D≤0.25 mm. According to some embodiments D≤0.1 mm, for example D≤0.05 mm. According to some embodiments, D≤0.25 mm, and the irradiation time t (on the same spot/location of the substrate) is in the range 0.1 ms to 250 ms. According to some embodiments, the irradiation time t (on the same spot of the substrate) is in the range 0.1 to 25 ms or 0.1 to 2.5 ms.

According to the embodiments, in order to form hole(s) 198, the condensed laser beam 133 has a power density $P_d$ ($W/cm^2$), defined by $P_d=P_0/S$, where $P_0$ and S are the power and the beam cross-sectional area of the condensed laser beam 133 on the substrate surface, respectively. In some embodiments $P_d \geq 0.7$ $kW/cm^2$. Preferably, the power density is higher, e.g., $P_d \geq 1$ k $W/cm^2$, and more preferably $P_d \geq 5$ $kW/cm^2$, (for example 5 $kW/cm^2$-5000 $kW/cm^2$). The high power densities described herein result in good ablation results, and provide good quality holes. As stated above, the substrate heating step provides transient and residual stress relaxation (i.e., stress reduction) around the hole during formation of the hole 198 in the substrate 190 by laser beam irradiation, which results in crack minimization or elimination. In addition, reheating the substrate 190 before laser-assisted hole formation and keeping the substrate in a heated state for a period of time immediately after the hole formation (e.g., 1 min to 20 min, or 5 min to 20 min) also minimizes or eliminates undesirable crack formations This exemplary embodiment utilizes a laser ablation process for making holes, for example tapered through holes in glass (or glass-ceramic) substrates induced by focused $CO_2$ laser irradiation preferably at the wavelength of 10.6 μm, and preferably in a burst mode. However, any laser wavelength that is longer than about 5000 nm can be used for the process. The laser beam 113 is focused by the optical system 115 to form a condensed laser beam 133 that forms the beam spot with a spot diameter D required to form the targeted hole diameter (e.g., the entrance hole diameter $Di_n$, the exit hole diameter $D_{out}$ or the average hole diameter $(D_{in}+D_{out})/2$).

Typically, the spot diameter D is set to be ≤0.5 mm (i.e., ≤500 μm). However, according some of the embodiments described herein, the spot diameter D, of the laser beam 113 at the incident surface of the substrate may be, for example, ≤0.25 mm (≤250 μm), ≤0.10 mm (≤100 μm), or even ≤0.05 mm (≤50 μm). In some embodiments 20 μm≤D≤100 μm. In some embodiments 20 μm≤D≤40 μm. In some embodiments 30 μm≤D≤40 μm. This enables high power density of about 5 kW to about 500 $kW/cm^2$ or more (e.g., from about 50 $kW/cm^2$ to about 500 $kW/cm^2$, or 50 $kW/cm^2$ to 1000 $kW/cm^2$, or 50 $kW/cm^2$ to about 5000 $kW/cm^2$), high peak power of the pulses (up to about 400 W) and a limited number N of pulses (e.g., N of about 1-100) of pulses with the pulse burst individual pulse duration within the burst of about 0.1 ms to about 5 ms, preferably about 0.1 ms to about 2.5 ms burst), and irradiation time per each single pulse within the burst of about 0.1 ms to about 500 ms, preferably about 0.1 ms to about 250 ms, about 0.1 to about 25 ms, or about 0.1 to about 2.5 ms. The burst duration may be for example, 0.1 ms to 2000 ms (e.g., 0.1 ms-100 ms), and the period between the individual pulses between the burst may be, for example, 5 ms, 10 ms, 20 ms, or therebetween (e.g., 25% to 50% duty cycle). However, as mentioned above, depending on the glass thickness, one can utilize a laser operating in a single-pulse operation mode, when several single-pulses are generated with extended intervals (e.g., ≥500 ms (≥0.5 s), ≥1000 ms (≥1 s), ≥2000 ms (≥2 s)) between the pulses.

According to the above-described effect, a hole 198 having a desired depth of d can be formed in a state where the occurrence of a crack is eliminated, inhibited, or greatly reduced.

Moreover, in the first manufacturing method, although the power density $P_d$ (W/cm$^2$) is high, occurrence of a crack can be inhibited or greatly reduced due to the stress relaxation induced by heating.

In this embodiment, in order to make multiple holes, a laser beam scanner 135 was utilized to control location of the holes and their pattern.

Example 2

Figure 2:
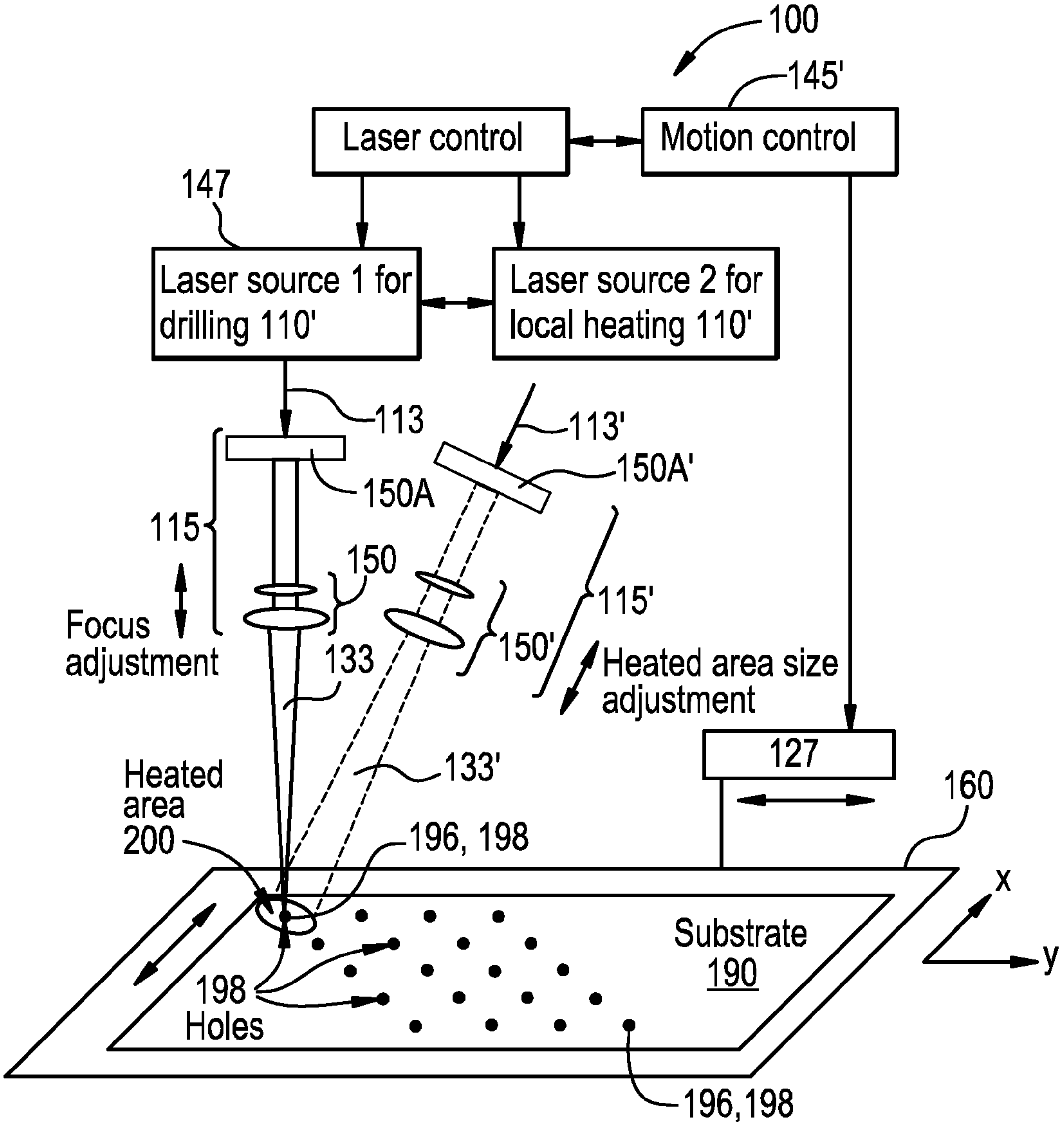
FIG. 2 is a schematic cross-sectional view of another embodiment apparatus for laser hole forming in brittle substrates.

FIG. 2 shows schematically another embodiment of a hole forming apparatus 100 that forms holes of depth d with a laser, in a pre-heated substrate made of a brittle material. The hole depth d can be equal to the substrate thickness, or be less than the substrate thickness.

As described above, the substrate 190 may be, for example, a glass substrate, or a glass ceramic substrate. The substrate may have, for example, a thickness between about 0.03 mm (30 μm) and about 5 mm (5000 μm), for example from about 0.5 mm (500 μm) to about 2 mm or 3 mm (2000 μm or 3000 μm).

More specifically, this embodiment utilizes local area pre-heating around the future hole. Local area preheating may be achieved, for example, by using laser irradiation (and thus heating) of the substrate at and around the desired hole location(s). Such local area preheating may be achieved, for example, by irradiating the area by a defocused, second beam, provided by a $CO_2$ laser. The local area pre-heating of the substrate at and around the hole location enables stress relaxation around the hole location prior to and during the hole formation process. It is preferable, for the substrates, that the substrate temperature be maintained above the annealing point temperature and below the softening point temperature (i.e., within the annealing range) after the hole formation for at least 1 to 30 min, for example 1 to 20 min, or 5-25 min (e.g., 3 min, 5 min, 10 min, 15 min, 20 min, 25 min, 30 min, or therebetween). The higher the temperature within the annealing range, the faster is the stress relaxation/stress reduction within the glass material of the substrate.

FIG. 2 illustrates a hole forming apparatus 100 that utilizes at least two lasers—one laser 110 for hole forming (first laser 110 is a pulse laser working preferably in a burst mode), and another laser 110' (laser 110' is preferably a long-pulse laser or CW (continuous wave) laser), for local area pre-heating. That is, in this exemplary embodiment, the first laser 110 provides the first laser beam 113 which is utilized for hole formation (e.g., glass drilling, or substrate material ablation). The second laser 110' provides the second laser beam 113' which is used for local area pre-heating—i.e., it creates a heated area 200 on the substrate 190. In this embodiment, the location of each of the laser beams are fixed relative to one another, and the stage 160 that supports the substrate moves in the X-Y direction (as indicated by arrows) relative to the laser beams. In this embodiment, the optical system 115 converts the laser beam 113 to a condensed laser beam 133 that is focused on the substrate 190, to form one or more hole(s) 198. The optical system 115' provides a defocused laser beam 133' on the substrate 190, for local area heating or pre-heating, for example via one or more defocusing components 150'. In addition, in this embodiment, a beam expander/collimator 150A was used between the laser and the focusing lenses 150 in order to expand the laser beam 113 prior to focusing it with the focusing lenses 150. Similarly, a beam expander 150A' was used between the laser and the focusing lenses 150' to expand the laser beam 113' prior to processing it with the de-focusing lens(s) 150'. The laser beam spot size and the beam intensity profile of the second laser 110' are controlled, in conjunction with the duration (sec) of pre-heating to enable preferably uniform heating across the substrate area at and/or around the irradiation position 196 to reach the required substrate temperature before the hole formation, without over- or under-heating. The beam spot diameter may be controlled by focusing/defocusing optics, and an even beam intensity distribution may be provided by a flat-top intensity profiler (also referred herein as the flat top beam shaper). Such flat-top intensity profilers are commercially available, and may be obtained for example from Edmund Scientific of Barrington, NJ, USA. Such flat top intensity profilers are capable of converting a Convert Gaussian Beam Profile to flat top or uniform intensity beam profile. Activation of the first laser beam 113 and of the second laser beam 113' is synchronized with a certain delay between them to enable the achievement of the required temperature of the substrate prior to drilling. In this embodiment, substrate motion is enabled by the motion controller 145' coupled to the X-Y motion stage 160, to enable forming (e.g., laser drilling) of multiple holes according to a desired hole pattern.

Example 3

Figure 3:
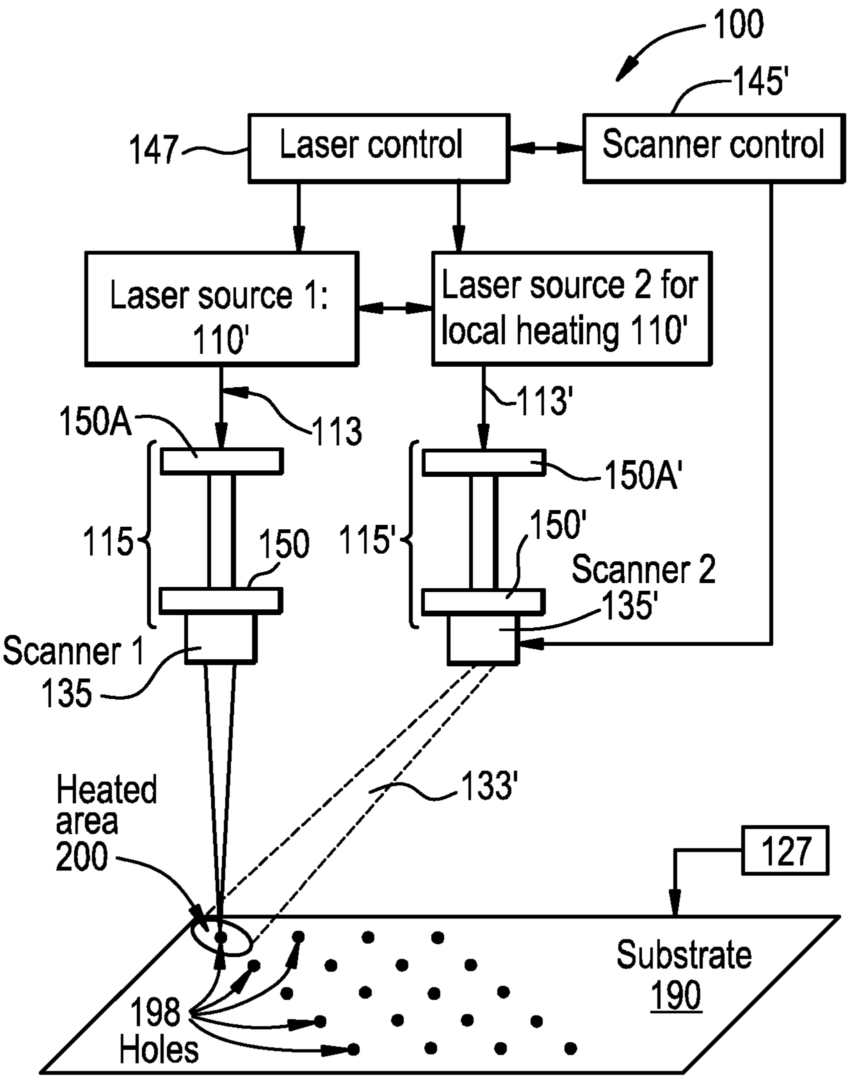
FIG. 3 is a schematic view of a third embodiment of the apparatus for laser hole forming in brittle substrates.

FIG. 3 shows schematically another embodiment of a hole forming apparatus 100 that forms holes of depth d with a laser, in a pre-heated substrate made of a brittle material, where d is equal to the substrate thickness or is less than the substrate thickness. The third embodiment is similar to the second embodiment in that it utilizes two lasers 110, 110'—one for hole forming (laser 110), and one for local area pre-heating (laser 110'). That is the second laser 110' creates a heated area 200 on the substrate, and the laser 110 provides the laser beam that forms the hole(s) 198 in the preheated area 200.

However, this embodiment uses two lasers (and two laser beams) synchronized by two scanners 135, 135', which enable control over location of the holes on a substrate and corresponding pattern without moving the substrate.

For the hole forming experiments corresponding to Embodiments 1-3 described above we utilized Coherent Diamond J2 and/or Coherent Diamond E400 lasers, operated at the wavelength of 10.6 μm. The Coherent Diamond J2 laser was used primarily as laser 110 for hole forming (hole drilling, and/or substrate material ablation), and worked in a burst mode with typical frequency of 100 Hz and duty cycle of 25%. Other frequencies (≤200 kHz) and duty cycles (≤60%) also were tested and used. The number of pulses (N) in a burst was varied from 1 to 100 or more. The E400 laser was mostly used for pre-heating of the substrates at or adjacent to areas corresponding to the irradiation positions 196, but also for forming holes (i.e., as laser 110) in thicker substrates (e.g., 1 mm to 3 mm thick substrates). The substrate thickness varied in the range from 30 μm up to 3 mm (but hole forming by the method(s) described herein in substrates with the thickness of up to 5 mm can also be done). Laser beam processing optical components (e.g., focusing lens(es) 150, or a defocusing lens(es), if needed) of the optical system 115 included a number of ZnSe spherical and aspherical lenses for laser beam collimation or expansion. Different beam spot diameters on the substrate surface were achieved by using either single spherical lenses with different focal distances, or by using a multi-lens optical system 115 comprised of a negative meniscus lens and of an aspheric lens, which allowed achievement of smaller spot size at similar focal distances. In addition, a beam expander/collimator 150A was used between the laser and the focusing lenses 150 to control laser beam waist location and for fine tuning the beam spot size. Alternatively, an optical system 115 comprising one or more reflective optical components can also be used for laser beam transformation, shaping, and/or beam size control. A flat-top beam shaper was used to convert the Gaussian laser beam profile into a flat-top profile to enable even (i.e., uniform) intensity distribution of the pre-heating laser beam.

Figure 4A:
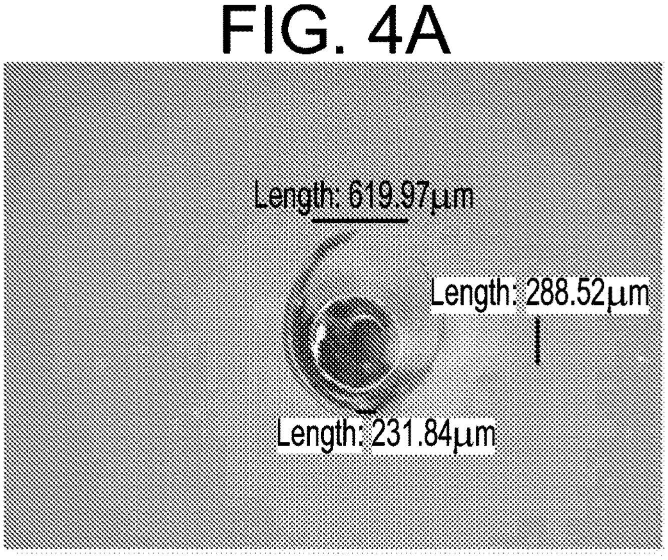
FIG. 4A illustrates a comparative example of the laser drilled hole formed in a glass substrate at room temperature by a comparative method, and illustrates formation of “arc” cracks around the hole.
Figure 4B:
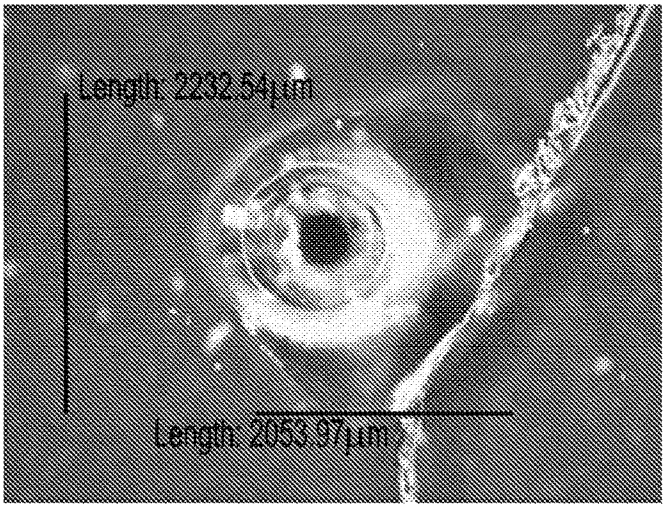
FIG. 4B illustrates a comparative example of the laser drilled hole corresponding to FIG. 4A, but with the cracks propagating through the substrate.

FIG. 4A illustrates a comparative example of the laser drilled hole formed in a glass substrate at room temperature by a comparative method, and illustrates formation of "arc" cracks around the hole. FIG. 4B illustrates a comparative example of the laser drilled hole corresponding to FIG. 4A, and shows the subsequent cracks originating at or near the "arc" cracks shown in FIG. 4A propagating through the substrate.

Figure 4C:
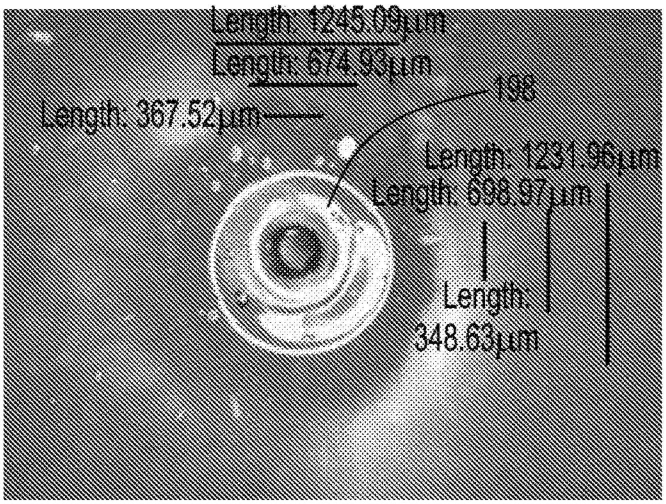
FIG. 4C illustrates an exemplary drilled hole with no “arc” crack formation, when the hole was formed in a glass substrate after the glass substrate was heated up to a temperature above annealing point, utilizing one embodiments of the method described herein.

FIG. 4C illustrates an exemplary laser formed hole 198 with no "arc" crack formation surrounding the hole. This hole was formed in a glass substrate after the glass substrate 190 was heated up to a temperature Tp above the annealing point, utilizing one of the embodiments of the method described herein.

The glass compositions for the substrates shown in FIG. 4A, and FIG. 4C were identical to one another. The formation of the holes was performed by the same laser, with the same power, beam spot, and pulse duration. The only difference was that the substrate 190 shown in FIG. 4C was preheated to the temperature Tp that is above the annealing point of the glass material. In the embodiment shown in FIG. 4C the temperature Tp was 820° C.

Figure 5A:
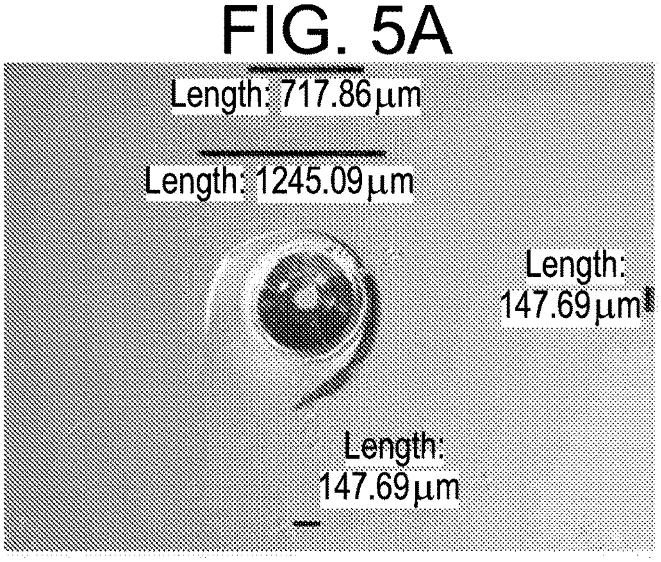
FIG. 5A illustrates a comparative example of the laser drilled hole formed in another glass substrate at room temperature by a comparative method, and also illustrates formation of “arc” cracks around the hole.
Figure 5B:
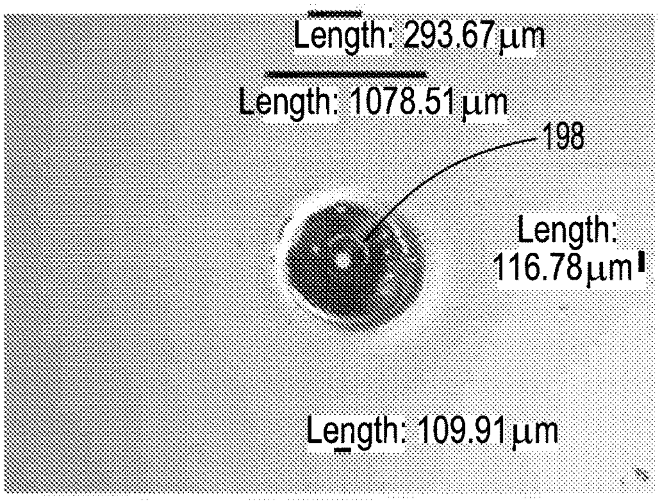
FIG. 5B illustrates an exemplary laser drilled hole formed in a glass substrate after the glass substrate was heated up to a temperature above annealing point, utilizing one of the embodiments of the method described herein.

FIG. 5A illustrates a comparative example of the laser drilled hole formed in another glass substrate at room temperature by a comparative method, and also illustrates formation of "arc" cracks around the hole. FIG. 5B illustrates an exemplary laser drilled hole formed in a glass substrate after the glass substrate was heated up to a temperature above annealing point, utilizing one of the embodiments of the method described herein. As can be seen from FIG. 5B, when pre-heating was utilized, there was no "arc" crack formation surrounding the hole. No subsequent cracks similar to those shown in FIG. 4B were observed propagating through the substrate after the hole formation.

The glass compositions for the substrates shown of FIG. 5A, and FIG. 5B were identical to one another. The formation of the holes was performed by the same laser, with the same power, beam spot, and pulse duration. The only difference was that the substrate 190 shown in FIG. 5B was preheated to the temperature Tp that is above the annealing point of the glass substrate material. In the embodiment shown in FIG. 5B the temperature Tp was 650° C.

Figure 6:
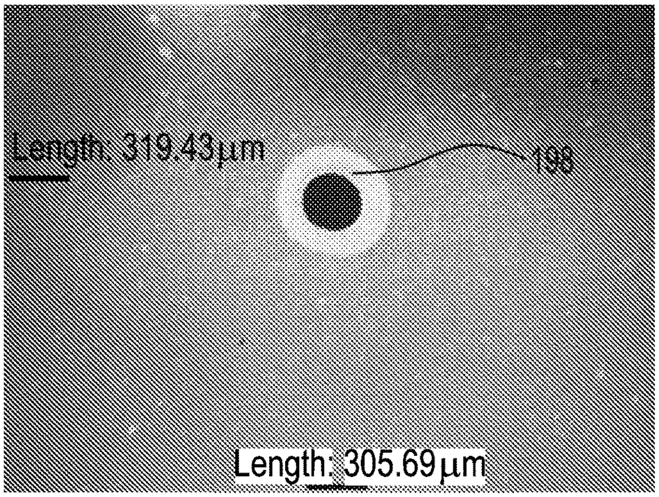
FIG. 6 illustrates an example of the laser drilled hole made in a glass-ceramic after the glass-ceramic substrate was heated up to a temperature above annealing point, utilizing one of the embodiments of the method described herein.

The methods described above were successfully utilized for forming holes in glass-ceramic substrates. Some of these glass ceramic substrates were only 0.05 mm to 0.1 mm thick. FIG. 6 illustrates an example of the laser formed hole made in a glass-ceramic substrate after the glass-ceramic substrate was heated up to a temperature below the softening point temperature point temperature but ≥500° C. (for example, ≥500° C., or ≥600° C., or ≥650° C., or 600° C. to 900° C., or 650 to 850° C., or 700° C. to 800° C.) utilizing one of the embodiments of the method described herein. As can be seen from this figure, there is no "arc" crack formation surrounding the hole. No subsequent cracks similar to those shown in FIG. 4B were observed propagating through this glass-ceramic substrate after the hole formation.

According to some embodiments an apparatus 100 for forming a hole with a depth of d (μm) or more in a substrate 190 comprises:

a heater 125 for preheating the substrate prior to hole formation to a temperature Tp, the heater comprising: an infrared incoherent heater, or an infrared discrete point (or discrete area) heating laser;

a laser 110 configured to emit a pulsed laser beam; and at least one optical component (e.g., focusing lens 150) configured to condense the pulsed laser beam onto the substrate, wherein when the pre-heated substrate 190 is irradiated with the pulsed and condensed laser beam 133 for an irradiation time t (for example by either a single laser pulse or multiple laser pulses), the pulsed laser beam forms a hole 198 in the substrate. According to some embodiments one or more of the surfaces of the substrate are protected from debris generated during hole forming (e.g., during laser drilling and/or laser assisted substrate material ablation), by using heated gas flow to prevent deposition of particles on substrate surface. The optical component(s) may be a refractive optical component, a reflective optical component, or a combination thereof. According to some embodiments, the laser is structured to operate in a pulse burst mode. According to some embodiments, the at least one optical component is a focusing lens 150 or multi-lens assembly configured to condense the pulsed laser beam into the substrate 190.

According to some embodiments the apparatus further comprises a component structured to provide a heated gas flow at or adjacent to at least one of the substrate surfaces, the heated gas preventing or minimizing deposition of debris on the substrate surface. According to some exemplary embodiments the heated gas (e.g., heated air or heated inert gas) has a temperature of at least 30° C., for example 30° C.-100° C.

As described above, a manufacturing method for a glass substrate and an apparatus for forming a hole 198 in the glass, glass ceramic or ceramic substrate according to the embodiment have been described with reference to FIGS. 1 to 3. However, the above descriptions are merely examples, and other embodiments may be implemented in other configurations. For example, the embodiments of the method described herein can be utilized for forming a non-through hole in a glass substrate.

According to some embodiments the hole 198 is a tapered hole, such that hole has an entrance hole diameter $D_{in}$ on the side of the substrate facing the optical system) and an exit hole diameter $D_{out}$ (back side diameter), and the entrance hole diameter is larger than the exit hole diameter. According to some embodiments the ratio R of the entrance hole diameter to the exit hole diameter is greater than 1.1. According to some embodiments the ratio R of the entrance hole diameter to the exit hole diameter is greater than 1.2, or greater than 1.3, or not less than 1.4. According to some embodiments, the ratio R of the entrance hole diameter to the exit hole diameter is at least 3. According to some embodiments the ratio of the entrance hole diameter to the exit hole diameter is between 1.1 and 3. According to some embodiments the ratio R of the entrance hole diameter $D_{in}$ to the exit hole diameter $D_{out}$ is between 1.3 and 3, or between 1.3 and 2.8. According to some embodiments the ratio R of the entrance hole diameter $D_{in}$ to the exit hole diameter $D_{out}$ is between 1.4 and 2.6.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of making a substrate comprising glass, glass ceramic or ceramic substrate and having at least one hole with a depth d, the method comprising the steps of:

(i) heating at least a portion of the substrate at least to the depth d to a temperature Tp that is above 500° C. and below 1500° C., to form a heated area of the substrate and thereby creating a pre-heated substrate; and (ii) irradiating at least a portion of the heated area of the substrate with a laser beam provided by a laser and condensed by an at least one optical component, to form at least one hole in the pre-heated substrate; and (iii) after formation of the at least one hole, maintaining the substrate, or areas around the at least one hole not less than 100° C. below the softening point temperature and above the annealing temperature for at least 1 to 30 minutes.

2. The method of claim 1, further comprising the step of supporting the heated substrate while the heated substrate and the laser beam move relative to one another.

3. The method of claim 1, wherein 500° C. ≤Tp≤900° C.

4. The method of claim 1, wherein the laser beam has a power density Pa (W/cm$^2$), defined by $$P_d = P_0/S,$$

where $P_0$ and S are the power and the cross-sectional area of said laser beam on substrate surface, respectively, of not less than 5 kW/cm$^2$.

5. The method according to claim 1, the heating step comprising: heating the entire substrate to the temperature Tp, where the temperature Tp is below softening point temperature of the substrate material by at least 10° C.

6. The method according to claim 1, the heating step comprising: heating at least one portion of said substrate to the temperature Tp by either a defocused pulsed laser beam or a CW laser beam.

7. The method according to claim 1 wherein:

the laser beam is condensed by a focusing optical component on substrate surface into a spot with diameter D of ≤0.5 mm; and the laser beam is emitted from a $CO_2$ or CO lasers for an irradiation time t at each irradiation position, such that the irradiation time t is from 0.1 ms to 500 ms.

8. The method of claim 7, wherein D≤0.25 mm.

9. The method of claim 8, wherein D≤0.1 mm.

10. The method of claim 9 wherein D≤0.05 mm.

11. The method of claim 7, wherein D≤0.25 mm, and the irradiation time t at each irradiation position is from 0.1 ms to 250 ms.

12. The method of claim 7, wherein the irradiation time t at each irradiation position is from 0.1 ms to 25 ms.

13. The method of claim 7, wherein the irradiation time t at each irradiation position is from 0.1 ms to 2.5 ms.

14. The method according to claim 1, wherein 30 μm≤d≤5000 μm.

15. The method of claim 14, wherein hole diameter is about 30 μm to 500 μm.

16. The method of claim 1, wherein the IR laser is a pulsed laser operating in a burst mode.

17. The method according to claim 1, wherein the hole is a through-hole.

18. The method according to claim 1, wherein the hole is a tapered hole, wherein said hole has an entrance hole diameter and an exit hole diameter, and the entrance hole diameter is larger than the exit hole diameter.

19. The method according to claim 18, the ratio of the entrance hole diameter to the exit hole diameter is at least 1.1.

20. The method according to claim 19 wherein the ratio of the entrance hole diameter to the exit hole diameter is greater than 1.3.

21. The method according to claim 19, wherein the ratio of the entrance hole diameter to the exit hole diameter is between 1.4 and 2.6.

22. The method according to claim 1, wherein the laser beam is delivered to the substrate after being condensed by an optical system; and wherein said heating step provides stress relaxation or stress reduction of transient stress and/or residual stress around the hole position prior to formation of the hole, and during formation of the hole in the substrate.

23. An apparatus for forming a hole with a depth of d within a glass, glass ceramic or ceramic substrate having at least one substrate surface, the apparatus comprising:

a heater structured to pre-heat the substrate prior to hole formation, to create a pre-heated substrate;

a laser capable of providing a laser beam; and at least one optical component configured to condense the laser beam provided by the laser onto the pre-heated substrate, said at least one optical component forming a condensed laser beam such that pre-heated substrate is irradiated with the condensed laser beam for an irradiation time t sufficient to form a hole in the substrate;

the apparatus is structured, to maintain the substrate, or areas around the at least one hole not less than 100° C. below the softening point temperature and above the annealing temperature for at least 1 to 30 minutes, after formation of the at least one hole.

24. The apparatus of claim 23, wherein the irradiation time t is from 0.1 ms to 250 ms.

25. The apparatus of claim 23, further comprising a stage capable of supporting the heated substrate while the heated substrate and the laser beam move relative to one another.

26. The apparatus of claim 25, wherein said stage is a movable stage, and/or said apparatus further comprises a scanner structured to scan the laser beam across the surface of the heated substrate.

27. The apparatus of claim 23, wherein said apparatus is structured such that said at least one substrate surface is protected from debris generated during hole forming by a heated gas flow that prevents deposition of the debris on said at least one substrate surface.

28. An apparatus of claim 23, wherein (i) the heater at least one of: an infrared incoherent heater, or an infrared discrete area heating laser;

(ii) the laser is a pulsed laser capable of providing a pulsed laser beam;

(iii) the pre-heated substrate is irradiated with the condensed laser beam for the irradiation time t (msec) by a single or multiple laser pulses.

29. An apparatus for forming a hole with a depth of d in a glass, glass ceramic or ceramic substrate according to claim 23, wherein the heater comprises: an infrared incoherent heater, or an infrared discrete area heating laser;

(ii) the laser capable of providing a laser beam is configured to emit a pulsed laser beam;

(iii) the at least one optical component is configured to condense the pulsed laser beam into the pre-heated substrate, to form a condensed pulsed laser beam such that the substrate is irradiated with the condensed pulsed laser beam for an irradiation time t (msec) by a single pulse or by multiple pulses, the pulsed laser beam forming a hole in the substrate; and the apparatus further comprising a component structured to provide heated gas flow to prevent deposition of particles on the at least one substrate surface.

30. The apparatus of claim 29, wherein the laser configured to emit a pulsed laser beam is a pulsed $CO_2$ laser.

31. The apparatus of claim 29, wherein the laser configured to emit a pulsed laser beam is structured to operate in a pulse burst mode.

32. The apparatus of claim 29, wherein said at least one optical component is a focusing lens or multi-lens assembly, said at least one optical component being configured to condense the pulsed laser beam into the substrate.

33. The apparatus according to claim 29, wherein said heated gas flow utilizes heated air or heated inert gas.

34. The apparatus according to claim 29, wherein said heated gas has a temperature of at least 30° C.

* * * * *